Patented July 14, 1953

2,645,622

UNITED STATES PATENT OFFICE 2,645,622

PRINTING INKS

Delbert H. Praeg, Plainfield, N. J., assignor to Sun Chemical Corporation, Long Island City, N. Y., a corporation of Delaware No Drawing. Application July 1, 1950, Serial No. 171,754

14 Claims. (Cl. 260—6)

The present invention relates to printing inks, and particularly to printing inks which are adapted to be set or dried by the application of water thereto in the form of vapor or steam.

One object of the present invention is to provide printing inks of the moisture or steam setting type which exhibit a high gloss after being imprinted upon a suitable base such as paper or cardboard stock.

Another object of the present invention is to provide printing inks of the moisture or steam setting type which, after treatment with moisture in the form of vapor or steam to effect setting of the same, exhibit a gloss comparable to that obtained upon air-drying of films of such inks.

Other objects of the present invention will be apparent from the following description and appended claims.

Printing inks of the so-called moisture or steam setting type are characterized by their ability to set as an imprinted film by the application thereto of water, usually in the form of vapor or steam. Such inks generally consist of a solution in a liquid which itself is miscible with water of a resinous binder material which is soluble in such liquid, or which is soluble in such liquid in the presence of limited quantities of water, but which is insoluble in such liquid when diluted with fairly large quantities of water. Therefore, when an imprinted film of such inks is subjected, while still in a wet or unset condition, to treatment with water in the form of vapor or steam, the resinous binder component contained in the ink film precipitates therefrom and becomes affixed to the surface or base upon which printing is done. Upon precipitation of the binder component of the ink film, the binder carries with it and affixes to the imprinted surface the coloring material contained in the ink film. The solvent component of the imprinted ink film which has been released from the binder component by such action and which has been diluted with water is generally disposed of either by rapid penetration of the solvent into the base upon which the film is imprinted, by evaporation of the solvent therefrom, or by a combination of both actions. The final effect of such treatment of the imprinted ink film with moisture is the almost instantaneous setting of the imprinted ink film to a non-offsetting, non-smudging condition.

Due to the nature of the materials employed in the preparation of printing inks of the steam setting type, such inks are generally non-toxic and free of unpleasant and objectionable odors. As a result such printing inks have obtained wide use in the printing of materials used in the packaging of foods. In the printing of such materials, the imprinted ink films may be allowed to dry under normal air-drying conditions, or they may be set with water as hereinbefore described. For example, carton stocks are often so highly absorbent as to require no mechanical assistance for the rapid setting of ink films imprinted thereon. Further, such stocks are often pre-cut in knockdown carton or container form and are printed as independent units, thereby substantially eliminating those conditions which cause offsetting and smudging of the imprinted ink film. In those instances where less absorbent stocks are employed and where volume of printing is desired, as for example, in the printing of bread wrappers, the printing operation is conducted upon a continuous web of the material to be imprinted which is then rewound for subsequent use in the packaging operation. In order to prevent offsetting of the imprinted ink film in such operations, the imprinted film is ordinarily treated with steam to effect setting of the ink film prior to the rewinding of the imprinted paper.

One major disadvantage arising out of the use of inks of the steam setting type in fields such as described above has been the lack of gloss in the dry print, particularly when the imprinted ink film has been treated with steam. Inks of the steam setting type which have hitherto been employed display very little gloss upon normal air-drying of the same, especially when imprinted on highly absorbent carton stocks. Further, treatment of the freshly imprinted ink film with steam seems to have the effect of completely destroying whatever gloss might ordinarily be obtained by normal air-drying of the imprinted ink. Just why this is so is not known with certainty but apparently the precipitation of the resinous binder of the imprinted ink film has an adverse effect upon the gloss properties of the finished print. Since very bright and highly glossy prints are generally desired on cartons, containers and wrapping materials for the sales appeal which such prints are known to have for the purchaser, it has long been desired to provide printing inks of the steam setting type in which the finished print is characterized by a high finish or gloss, especially after treatment of the imprinted ink film to effect setting of the same.

By the present invention, there are provided printing inks of the steam setting type which not only furnish highly glossy prints upon drying under normal air-drying conditions, but which, after treatment of an imprinted film thereof with steam to effect setting of the same, exhibit a gloss of at least comparable to that obtained under normal air-drying conditions and, in many instances, in which the gloss of the imprinted ink film is apparently enhanced by the application of steam thereto. The printing inks of the present invention comprise a vehicle which comprises a water-insoluble resinous binder material dissolved in a liquid polyglycol solvent, and which includes as an essential component thereof an alcohol-soluble N-alkoxymethyl polymethylene polyamide of the type described in United States Patent 2,430,860.

The alcohol soluble polyamides which have been found suitable for use in the printing inks of the present invention, are those of the class resulting from the chemical modification, with formaldehyde and an alcohol in the presence of an oxygen-containing acid catalyst of the type set forth in United States Patent 2,430,860, of a high molecular weight, fiber-forming, linear polyamide of the type described in United States Patents 2,071,250; 2,071,253; and 2,130,948. High molecular weight linear polyamides which may be chemically modified to yield the alcohol soluble reaction products described in United States Patent 2,430,860 comprise the reaction products of polyamide-forming compositions in which each of the starting materials thereof contains two, and only two, functional groups capable of participating in the reaction, in which the functional groups of each of the starting materials are complementary polymer-forming groups with respect to the functional groups of the other of the starting materials, and wherein the functional groups of each of the starting materials are capable of forming amide groups with the functional groups of the other of the starting materials. For example, such high molecular weight, linear polyamides may be obtained from the reaction, in chemically equivalent amounts, of an aliphatic diamine having at least one hydrogen attached to each nitrogen thereof with a dibasic carboxylic acid, or with an amide-forming derivative of a dibasic carboxylic acid, such as the esters, anhydrides, or acyl halides of the said acids. Such linear polyamides may also be obtained by the self-polymerization of a monoaminomonocarboxylic acid, or by reacting a monoaminomonohydric alcohol with a dibasic carboxylic acid in substantially equimolecular amounts. The high molecular weight linear polyamides which are treated according to the processes described in United States Patent 2,430,860 to provide alcohol-soluble products are preferably those which have an intrinsic viscosity of at least 0.4 and a unit length of at least 7, wherein intrinsic viscosity and unit length are defined as in United States Patent 2,130,948.

As described in United States Patent 2,430,860, alcohol-soluble polyamides may be obtained by reacting a high molecular weight, linear polyamide of the type above set forth with from about 50% to 100% by weight based upon the weight of the said polyamide of formaldehyde, and with an alcohol in the molar ratio of alcohol to formaldehyde of from 1 to 2 mols of alcohol to 1 mol of formaldehyde until at least 10% of the amide groups occurring in the polyamide have undergone reaction, such reaction involving the substitution of alkoxymethyl groups for the hydrogen of the amide groups. Polyamides which have been found to be particularly well adapted for use in inks of the steam setting type to obtain the desirable results of the present invention are the alcohol-soluble polyamides resulting from the reaction of a polyhexamethylene polyamide with formaldehyde and methanol, such as, for example, alcohol-soluble N-methoxymethyl polyhexamethylene adipamide and alcohol-soluble N-methoxymethyl polyhexamethylene sebacamide.

As solvents for the resinous binder materials of the inks of the present invention there are preferably employed diethylene glycol, dipropylene glycol, and 2-methyl-2-4-pentanediol, although generally any of the liquid polyglycols will be found to be satisfactory.

Resinous materials which have been found useful in the preparation of the inks of the present invention, are for example, zein, allyl starch, the manila resins, alcohol-soluble resinous condensation products of phenol and formaldehyde, resinous condensation products of rosin and alpha beta unsaturated carboxylic acids such as maleic and fumaric acids, and generally any of the glycol soluble resins which have been found suitable in the preparation of printing inks of the steam setting type. It is understood that any of the coloring materials commonly utilized in conventional moisture-set printing inks may satisfactorily be incorporated in the inks of the present invention.

Generally any of the methods commonly employed in the industry may be employed in the preparation of the inks of the present invention. However, a highly satisfactory procedure for the preparation of the ink vehicle is as follows. A weighed amount of the solvent is charged to a suitable vessel and heated to a temperature of approximately 140° C. At this point, a predetermined amount of pulverized resin and polyamide are slowly added to the solvent with agitation to prevent lumping of the resin, while gradually increasing the temperature of the vehicle to approximately 200° C. When substantially complete solution of the resinous material has been obtained, the vehicle is allowed to cool to approximately 150° C. and any solvent which may have been lost by evaporation is thereupon replaced. Pigment and other addition agents well known in the art may then be added to the cooled vehicle by the customary milling and mixing methods.

To obtain the highly desirable results of the present invention, the polyamide should be employed in an amount within the range of approximately 0.5 to approximately 5.0% by weight based on the weight of the vehicle. When employed in amounts less than approximaely 0.5% by weight of the vehicle, very little or no improvement at all is observed in the gloss properties of the finished ink. Increasing the polyamide content of the vehicle above approximately 5.0% by weight of the vehicle does not improve the finish of the ink over that obtained by the use of the same in the preferred range, and furthermore imparts several undesirable characteristics to the finished ink. For example, it promotes "flying" or "misting" of the ink during high speed rotary printing operations. Excessive amounts of the polyamide also result in a serious increase in both the tack and shortness of the finished ink. Since the ink vehicles of the inks of the present invention usually constitute from approximately 60% by weight to approximately 95% by weight of the said inks, although such a range should not be considered as limiting the ratio of pigment to vehicle which may be employed in preparing these inks, the amount of polyamide which will provide printing inks having the characteristics of those of the present invention will be found to be satisfactorily within the range of approximately 0.3 to approximately 4.75% by weight based on the weight of the finished ink.

Typical of successful commercial inks prepared according to the present invention are the following illustrative examples.

Example 1

| | Parts by weight |
|---|---|
| Resinous reaction product of rosin and maleic acid | 18.8 |
| Zein | 4.23 |
| N - methoxymethyl polyhexamethylene adipamide (softening point 135–140° C.) | 0.47 |
| Dipropylene glycol | 49.5 |
| Barium red lake C pigment | 21.0 |
| Lithol rubine pigment | 2.0 |
| Wax | 4.0 |
| | 100.00 |

Example 2

| | Parts by weight |
|---|---|
| Resinous reaction product of rosin and maleic acid | 37.13 |
| N - methoxymethyl polyhexamethylene adipamide (softening point 135–140° C.) | 2.37 |
| Dipropylene glycol | 39.5 |
| Diethylene glycol | 8.0 |
| Victoria blue pigment | 10.0 |
| Wax | 3.0 |
| | 100.00 |

Example 3

| | Parts by weight |
|---|---|
| Resinous reaction product of rosin and maleic acid | 27.5 |
| N-methoxymethyl polyhexamethylene adipamide (softening point 150° C.) | 2.3 |
| Zein | 5.0 |
| Diethylene glycol | 55.7 |
| Benzidine yellow pigment | 6.5 |
| Wax | 3.0 |
| | 100.0 |

Example 4

| | Parts by weight |
|---|---|
| Resinous reaction product of rosin and maleic acid | 15.05 |
| Zein | 3.06 |
| N - methoxymethyl polyhexamethylene adipamide (softening point 150° C.) | 3.29 |
| Diethylene glycol | 52.6 |
| Barium red lake C pigment | 21.0 |
| Lithol rubine pigment | 2.0 |
| Wax | 3.0 |
| | 100.00 |

Example 5

| | Parts by weight |
|---|---|
| Resinous reaction product of phenol and formaldehyde | 28.44 |
| Zein | 5.53 |
| N - methoxymethyl polyhexamethylene adipamide (softening point 135–140° C.) | 2.37 |
| 2-methyl-2-4 pentanediol | 50.66 |
| Monastral blue pigment | 10.0 |
| Wax | 3.0 |
| | 100.00 |

Example 6

| | Parts by weight |
|---|---|
| Manila resin | 17.32 |
| Zein | 3.6 |
| N - methoxymethyl polyhexamethylene adipamide (softening point 135–140° C.) | 1.44 |
| Diethylene glycol | 26.24 |
| Dipropylene glycol | 25.4 |
| Barium red lake C pigment | 21.0 |
| Lithol rubine pigment | 2.0 |
| Wax | 3.0 |
| | 100.00 |

Example 7

| | Parts by weight |
|---|---|
| Resinous reaction product of rosin and maleic acid | 18.8 |
| Allyl starch | 8.74 |
| N - methoxymethyl polyhexamethylene adipamide (softening point 135–140° C.) | 1.2 |
| Dipropylene glycol | 45.26 |
| Barium red lake C pigment | 21.0 |
| Lithol rubine pigment | 2.0 |
| Wax | 3.0 |
| | 100.00 |

The wax employed in each of the above illustrative examples may satisfactorily be any of those waxes employed in the printing ink industry to impart a certain degree of "slip" to the finished print as, for example, paraffin wax, microcrystalline hydrocarbon waxes, or the vegetable waxes such as carnauba wax.

Some of the vehicles of the inks of the present invention often display a certain degree of cloudiness. Addition to the solvent of approximately 3 to 4% by weight of the vehicle of a solid polyglycol such as Carbowax 1500 makes a great improvement in the clarity of the vehicle and seems to produce a much more effective dispersion of the polyamide.

It is not known with certainty why the polyamide imparts such exceptional gloss properties to the inks of the present invention, but it is known that comparable ink formulations in which the polyamide has been omitted show very little gloss under normal air-drying conditions, and that whatever gloss may commonly be obtainable under such conditions is not usually had when imprinted films of such inks are subjected to the moisture or steam setting treatment. Conversely, the application of steam to the imprinted ink film of the inks of the present invention seems, in most cases, to enhance the high gloss ordinarily obtainable by the use of such inks, and this is especially true when such inks have been imprinted upon the less absorbent stocks such as manila board. The printing inks of the present invention also display good printing qualities, improved binding and rub-resistance over those inks of the steam setting type which have hitherto been employed, and have very little tendency to "fly" or "mist" when employed in high speed rotary printing operations.

While the above compositions and processes of preparing the same constitute preferred embodiments of the present invention, changes may be made therein without departing from the scope of the invention as defined in the appended claims.

What is claimed is:

1. A vehicle for a printing ink comprising a glycol-soluble, water-insoluble resinous binder dissolved in a liquid polyglycol solvent, and including from approximately 0.5% to approximately 5.0% by weight based on the weight of the vehicle of alcohol-soluble N-alkoxymethyl polymethylene polyamide.

2. A vehicle for a printing ink comprising a glycol-soluble, water-insoluble resinous binder dissolved in a liquid polyglycol solvent, and including from approximately 0.5% to approximately 5.0% by weight based on the weight of the vehicle of alcohol-soluble N-methoxymethyl polyhexamethylene adipamide.

3. A vehicle for a printing ink comprising a resinous condensation product of rosin and maleic acid dissolved in a liquid polyglycol solvent, and including from approximately 0.5% to approximately 5.0% by weight based on the weight of the vehicle of alcohol-soluble N-methoxymethyl polyhexamethylene adipamide.

4. A vehicle for a printing ink comprising a resinous condensation product of phenol and formaldehye dissolved in a liquid polyglycol solvent, and including from approximately 0.5% to approximately 5.0% by weight based on the weight of the vehicle of alcohol-soluble N-methoxymethyl polyhexamethylene adipamide.

5. A vehicle for a printing ink comprising zein dissolved in a liquid polyglycol solvent and including from approximately 0.5% to approximately 5.0% by weight based on the weight of the vehicle of alcohol-soluble N-methoxymethyl polyhexamethylene adipamide.

6. A vehicle for a printing ink comprising allyl starch dissolved in a liquid polyglycol solvent, and including from approximately 0.5% to approximately 5.0% by weight based on the weight of the vehicle of alcohol-soluble N-methoxymethyl polyhexamethylene adipamide.

7. A vehicle for a printing ink comprising manila resin dissolved in a liquid polyglycol solvent, and including from approximately 0.5% to approximately 5.0% by weight based on the weight of the vehicle of alcohol-soluble N-methoxymethyl polyhexamethylene adipamide.

8. A printing ink comprising coloring material dispersed in a vehicle comprising a glycol-soluble, water-insoluble resinous binder dissolved in a liquid polyglycol solvent, and including from approximately 0.3% to approximately 4.75% by weight based on the weight of the ink of alcohol-soluble N-alkoxymethyl polymethylene polyamide.

9. A printing ink comprising coloring material dispersed in a vehicle comprising a glycol-soluble, water-insoluble resinous binder dissolved in a liquid polyglycol solvent and including from approximately 0.3% to approximately 4.75% by weight based on the weight of the ink of alcohol-soluble N-methoxymethyl polyhexamethylene adipamide.

10. A printing ink comprising coloring material dispersed in a vehicle comprising a resinous condensation product of rosin and maleic acid dissolved in a liquid polyglycol solvent, and including from approximately 0.3% to approximately 4.75% by weight based on the weight of the ink of alcohol-soluble N-methoxymethyl polyhexamethylene adipamide.

11. A printing ink comprising coloring material dispersed in a vehicle comprising a resinous condensation product of phenol and formaldehyde dissolved in a liquid polyglycol solvent, and including from approximately 0.3% to approximately 4.75% by weight based on the weight of the ink of alcohol-soluble N-methoxymethyl polyhexamethylene adipamide.

12. A printing ink comprising coloring material dispersed in a vehicle comprising zein dissolved in a liquid polyglycol solvent, and including from approximately 0.3% to approximately 4.75% by weight based on the weight of the ink of alcohol-soluble N-methoxymethyl polyhexamethylene adipamide.

13. A printing ink comprising coloring material dispersed in a vehicle comprising allyl starch dissolved in a liquid polyglycol solvent, and including from approximately 0.3% to approximately 4.75% by weight based on the weight of the ink of alcohol-soluble N-methoxymethyl polyhexamethylene adipamide.

14. A printing ink comprising coloring material dispersed in a vehicle comprising manila resin dissolved in a liquid polyglycol solvent, and including from approximately 0.3% to approximately 4.75% by weight based on the weight of the ink of alcohol-soluble N-methoxymethyl polyhexamethylene adipamide.

DELBERT H. PRAEG.

References Cited in the file of this patent

UNITED STATES PATENTS

| Number | Name | Date |
|---|---|---|
| 2,289,638 | Erickson et al. | July 14, 1942 |
| 2,299,839 | McQueen | Oct. 27, 1942 |
| 2,323,710 | Erickson et al. | July 6, 1943 |
| 2,327,597 | Erickson et al. | Aug. 24, 1943 |
| 2,332,066 | Erickson et al. | Oct. 19, 1943 |
| 2,390,102 | Jeuck | Dec. 4, 1945 |
| 2,397,019 | Kroeger et al. | Mar. 19, 1946 |
| 2,404,680 | Aneshansel | July 23, 1946 |
| 2,435,412 | Soday | Feb. 3, 1948 |
| 2,463,869 | Hamilton et al. | Mar. 8, 1949 |

FOREIGN PATENTS

| Number | Country | Date |
|---|---|---|
| 598,576 | Great Britain | Feb. 20, 1948 |